(12) United States Patent
Iseki (10) Patent No.: US 9,688,203 B2
(45) Date of Patent: Jun. 27, 2017

(54) TURN SIGNAL LAMP ASSEMBLY FOR VEHICLE DOOR MIRROR, AND VEHICLE DOOR MIRROR

(71) Applicant: Murakami Corporation, Shizuoka (JP)

(72) Inventor: Kota Iseki, Shizuoka (JP)

(73) Assignee: MURAKAMI CORPORATION, Shizuoka (JP)

(*) Notice: Subject to any disclaimer, the term of this patent is extended or adjusted under 35 U.S.C. 154(b) by 0 days.

(21) Appl. No.: 14/897,318

(22) PCT Filed: Jun. 4, 2014

(86) PCT No.: PCT/JP2014/064818
§ 371 (c)(1),
(2) Date: Dec. 10, 2015

(87) PCT Pub. No.: WO2014/199875
PCT Pub. Date: Dec. 18, 2014

(65) Prior Publication Data
US 2016/0129843 A1    May 12, 2016

(30) Foreign Application Priority Data

Jun. 14, 2013  (JP) .................................. 2013-125155

(51) Int. Cl.
*B60R 1/12*   (2006.01)
*B60Q 1/34*   (2006.01)
(Continued)

(52) U.S. Cl.
CPC .......... *B60R 1/1207* (2013.01); *B60Q 1/2665* (2013.01); *B60Q 1/34* (2013.01);
(Continued)

(58) Field of Classification Search
CPC ........ B60R 1/1207; B60R 1/06; B60Q 1/2665; B60Q 1/34; F21S 48/215; F21S 48/2237;
(Continued)

(56) References Cited

U.S. PATENT DOCUMENTS 8,113,701 B2 * 2/2012 Ishikawa .............. B60Q 1/2665
362/487
9,216,690 B2  12/2015 Schmierer et al.
(Continued)

FOREIGN PATENT DOCUMENTS

CN    102294976    12/2011
CN    102815261    12/2012
(Continued)

OTHER PUBLICATIONS

Official Action, along with English-language translation thereof, in CN Appl. No. 201480033969.7 dated Oct. 17, 2016.
(Continued)

*Primary Examiner* — Laura Tso
(74) *Attorney, Agent, or Firm* — Greenblum & Bernstein, P.L.C.

(57) ABSTRACT

A casing of a turn signal lamp assembly includes a lamp housing and an outer lens, each of which includes a transparent member, being overlaid on each other and joined to each other at peripheral edges. The lamp housing includes a light entrance portion that receives incident light emitted from a light source, a light-guiding lens portion that guides the incident light, and a light exit portion that outputs the guided light.

20 Claims, 5 Drawing Sheets

(51) Int. Cl.
  *B60R 1/06* (2006.01)
  *B60Q 1/26* (2006.01)
  *F21S 8/10* (2006.01)

(52) U.S. Cl.
  CPC .............. *B60R 1/06* (2013.01); *F21S 48/215* (2013.01); *F21S 48/2237* (2013.01); *F21S 48/2262* (2013.01); *F21S 48/2268* (2013.01); *F21S 48/2281* (2013.01)

(58) Field of Classification Search
  CPC . F21S 48/2262; F21S 48/2268; F21S 48/2281
  USPC ................................................. 362/511, 494
  See application file for complete search history.

(56) References Cited

U.S. PATENT DOCUMENTS

| | | | |
|---|---|---|---|
| 2006/0146555 A1* | 7/2006 | Inaba | B60Q 1/2665 362/494 |
| 2008/0106396 A1* | 5/2008 | Hsieh | B60Q 1/2665 340/475 |
| 2010/0238015 A1* | 9/2010 | Fukasawa | B60Q 1/2665 340/465 |
| 2011/0235353 A1* | 9/2011 | Fukasawa | B60Q 1/2665 362/494 |
| 2011/0317445 A1 | 12/2011 | Schmierer et al. | |
| 2012/0314425 A1 | 12/2012 | Fukai et al. | |
| 2013/0083550 A1 | 4/2013 | Ishigami et al. | |

FOREIGN PATENT DOCUMENTS

| | | |
|---|---|---|
| CN | 202656923 | 1/2013 |
| JP | 2007-280924 | 10/2007 |
| JP | 2008-226755 | 9/2008 |
| JP | 2009-99456 | 5/2009 |
| JP | 2009-99458 | 5/2009 |
| JP | 4622978 | 2/2011 |
| JP | 5116432 | 1/2013 |
| JP | 2013-75608 | 4/2013 |

OTHER PUBLICATIONS

International Search Report, including an English-language translation thereof, for PCT/JP2014/064818, having a mailing date of Sep. 2, 2014.

Written Option of the International Searching Authority, including an English-language translation thereof, for PCT/JP2014/064818, having a mailing date of Sep. 2, 2014.

English-language translation of the Preliminary Report on Patentability for PCT/JP2014/064818, having an issuance date Dec. 15, 2015.

Office Action issued in Japan Counterpart Patent Appl. No. 2013-125155, dated Jan. 10, 2017, along with an English translation thereof.

\* cited by examiner

TURN SIGNAL LAMP ASSEMBLY FOR VEHICLE DOOR MIRROR, AND VEHICLE DOOR MIRROR

The disclosure of Japanese Patent Application No. JP2013-125155 filed on Jun. 14, 2013 including the specification, drawings, claims and abstract is incorporated herein by reference in its entirety.

TECHNICAL FIELD

This invention relates to a turn signal lamp assembly having a structure in which a front surface of light-guiding member is covered by transparent member and a vehicle door mirror with the turn signal lamp assembly incorporated therein, with improvement in ease of assembly of the turn signal lamp assembly.

BACKGROUND ART

Figure 7:
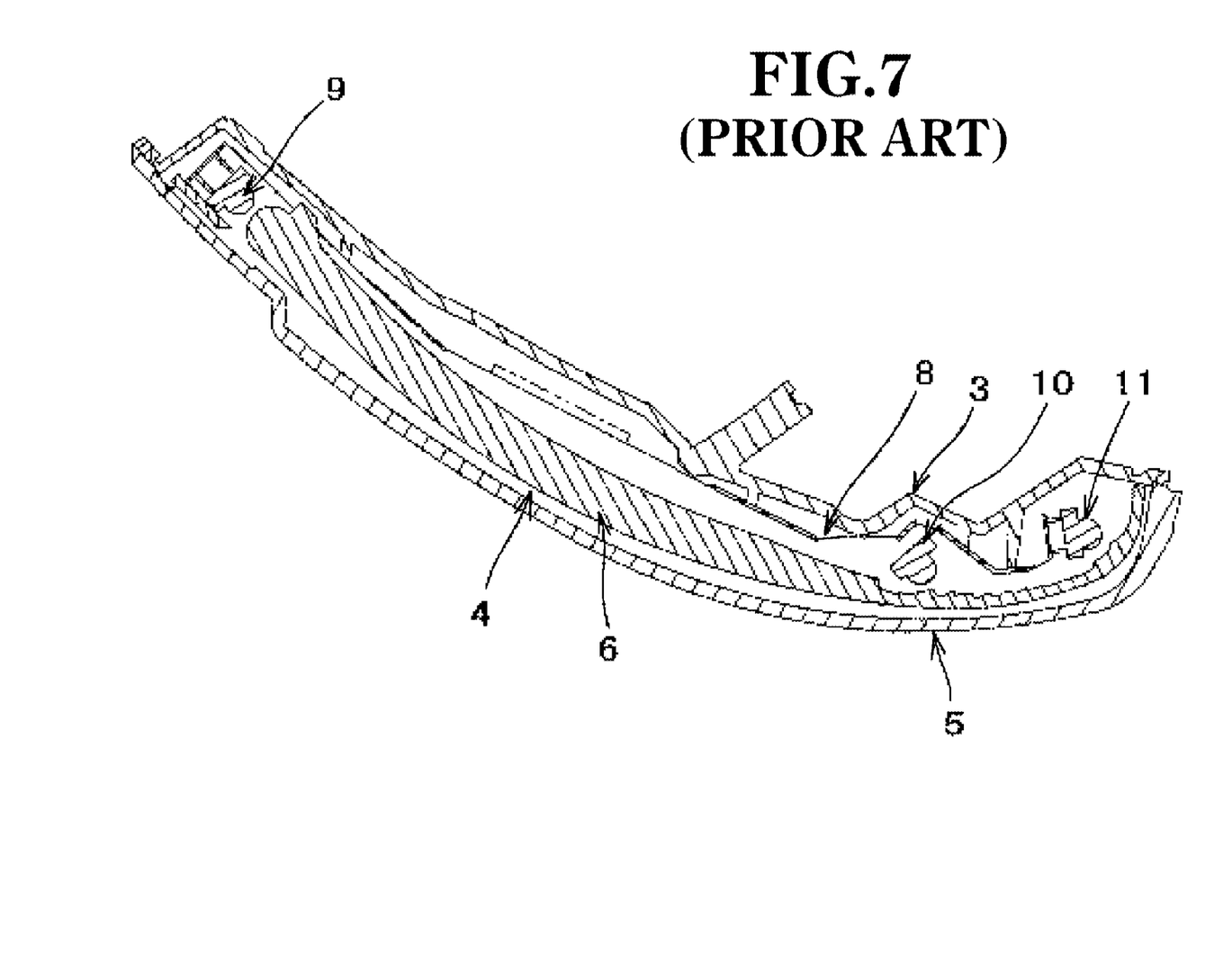
FIG. 7 is a cross-sectional view in a long direction of a conventional turn signal lamp assembly described in Patent Literature 1.

A conventional turn signal lamp assembly having a structure in which a front surface of a light-guiding member (a surface of a light-guiding member, the surface facing outward when the turn signal lamp assembly is assembled to a vehicle door mirror) is covered by a transparent member is described in Patent Literature 1 indicated below. As illustrated in FIG. 7, the turn signal lamp assembly is configured in such a manner that an outer lens 5 (transparent member) on the front side (side facing outward when the turn signal lamp assembly is assembled to a vehicle door mirror) and a base housing 3 (non-transparent member) on the back side (side hidden from the outside when the turn signal lamp assembly is assembled to a vehicle door mirror) form a casing (enclosure) and an inner housing 4 is incorporated in an internal space surrounded by the casing. The inner housing 4 includes an inner member (non-transparent member) and a light-guiding member 6 (transparent member), the light-guiding member 6 is incorporated into the inner member from the front side of the inner member, and the inner housing 4 is held by the base housing 3. In the inner housing 4, a light source unit 8 including LEDs 9, 10 and 11 is incorporated. Since the light-guiding member 6 is covered by the outer lens 5, the light-guiding member 6 is prevented from being damaged as a result of being hit by a stone or the like, and the light-guiding member 6 is also prevented from its light-guiding function being impaired as a result of rain drops adhering to the light-guiding member 6.

CITATION LIST

Patent Literature

Patent Literature 1: Japanese Patent Laid-Open No. 2009-99456 (FIG. 2)

SUMMARY OF INVENTION

Technical Problem

The aforementioned conventional turn signal lamp assembly is configured in such a manner that the inner housing 4 that holds the light-guiding member 6 is incorporated in the base housing 3 and the base housing 3 is closed up with the outer lens 5, which is poor in ease of assembly of the turn signal lamp assembly (efficiency of assembling the turn signal lamp assembly).

This invention is intended to solve the aforementioned problem in the conventional techniques and provide a turn signal lamp assembly with improvement in ease of assembly and a vehicle door mirror with the turn signal lamp assembly incorporated therein.

Solution to Problem

A turn signal lamp assembly according to this invention includes a casing having a structure resulting from a front-side transparent member and a back-side transparent member being overlaid on each other and joined to each other at peripheral edges, the back-side transparent member includes a light entrance portion that receives incident light emitted from a light source, a light-guiding portion that guides the incident light, and a light exit portion that outputs the guided light. In this configuration, the back-side transparent member forming a back side of the casing doubles as the light-guiding portion, and the number of parts in members forming the casing and the light-guiding portion can be reduced compared to the case where a part forming the back side of the casing and the light-guiding portion are formed by individual members. Therefore, the ease of assembly of a turn signal lamp assembly can be improved.

The turn signal lamp assembly according to this invention can include a light-blocking surface that blocks light passing through the back-side transparent member in a front-back direction, at a back surface of the casing. With this configuration, the back surface of the casing of the turn signal lamp assembly includes a light-blocking surface, and thus, when the turn signal lamp assembly is incorporated in a door mirror, turn signal light from a back surface of the back-side transparent member can be prevented from leaking to the front surface side of the door mirror (rear side of the vehicle) and being viewed by, e.g., a driver from a gap between an outer peripheral edge of a mirror plate and an opening of a mirror housing. Also, the inside of the door mirror can be prevented from being seen through the turn signal lamp assembly from a back surface side of the door mirror (front side of the vehicle).

In the turn signal lamp assembly according to this invention, it is possible that: the casing has an elongated shape; the back-side transparent member includes a ridge at a center in a short direction of front surface thereof, the ridge extending in a long direction; and the ridge includes the light entrance portion, the light-guiding portion and the light exit portion. With this configuration, the light-guiding portion is defined in the back-side transparent member by the ridge, enabling light emitted from a light source to be efficiently guided to the light exit portion through the ridge. In the turn signal lamp assembly according to this invention, it is possible that the front-side transparent member includes a recess that receives the ridge, in a back surface thereof. With this configuration, the ridge is received and disposed in the recess, enables suppression of increase in thickness of the turn signal lamp assembly due to the existence of the ridge.

A door mirror according to this invention is a vehicle door mirror with a turn signal lamp assembly incorporated therein, wherein: the turn signal lamp assembly includes a casing having a structure resulting from a front-side transparent member and a back-side transparent member being overlaid on each other and joined to each other at peripheral edges; the back-side transparent member includes a light entrance portion that receives incident light emitted from a light source, a light-guiding portion that guides the incident light, and a light exit portion that outputs the guided light; and the vehicle door mirror includes a light-blocking surface that blocks light passing through the back-side transparent member in a front-back direction, at a back surface side of the casing of the turn, signal lamp assembly. With this configuration, a light-blocking surface is disposed on the back surface side of the casing of the turn signal lamp assembly, enabling turn signal light from a back surface of the back-side transparent member to be prevented from leaking to the front surface side of the door mirror and being viewed by, e.g., a driver from a gap between an outer peripheral edge of a mirror plate and an opening of a mirror housing. Also, the inside of the door mirror can be prevented from being seen through the turn signal lamp assembly from a back surface side of the door mirror.

It is possible that the light-blocking surface is, for example, fixedly disposed at a back surface of the casing of the turn signal lamp assembly or a surface of the mirror housing with the turn signal lamp assembly disposed therein, the surface facing the back surface of the casing, or is disposed so as to be held between the back surface of the casing and the surface of the mirror housing, the surface facing the back surface of the casing. In other words, the light-blocking surface cart be disposed at any of various positions. In this case, it is possible that the light-blocking surface fixedly disposed at the surface of the mirror housing, the surface facing the back surface of the casing includes, for example, a material surface including a non-transparent material, the non-transparent material being included in the mirror housing. With this configuration, the material surface of the mirror housing is used as it is for the light-blocking surface, eliminating the need to provide another member for forming the light-blocking surface or to perform additional processing and thus enabling easy provision of the light-blocking surface.

In the door mirror according to this invention, it is possible that at a position in a part from the back surface of the casing of the turn signal lamp assembly to the light-blocking surface, a decorative surface that provides a visual effect that is different from a visual effect provided by the material included in the mirror housing when the turn signal lamp assembly is viewed through the front surface from the front surface side is provided. With this configuration, a visual effect that is different from a visual effect provided by the material included in the mirror housing can be provided by the decorative surface. The decorative surface can doubles as the light-blocking surface.

It is possible that the decorative surface is, for example, fixedly disposed at the back surface of the casing of the turn signal lamp assembly or the surface of the mirror housing, the surface facing the back surface of the casing, or is disposed so as to be held between the back surface of the casing and the surface of the mirror housing, the surface facing the back surface of the casing. In other words, the decorative surface can be disposed at any of various positions.

Also, it is possible that the decorative surface is disposed via, for example, any of attachment of a plate-like or film-like decorative member to, coating of, formation of a metal film on, texturing of, and embossing of, the back surface of the casing of the turn signal lamp assembly or the surface of the mirror housing, the surface facing the back surface of the casing, and holding of a plate-like or film-like decorative member between the back surface of the casing and the surface of the mirror housing, the surface facing the back surface of the casing. In other words, the decorative surface can have any of various structures, and consequently, the decorative surface can enhance the efficiency of emission of turn signal light to the front side of the turn signal lamp assembly (front side of the vehicle) and can provide some kind of effect in terms of design to the front side of the turn signal lamp assembly.

In the door mirror according to this invention, it is possible that: a recessed lamp housing portion including a non-transparent peripheral wall surface is formed in the mirror housing; and the turn signal lamp assembly is housed and disposed in the lamp housing portion. With this configuration, light emitted from the turn signal lamp assembly is prevented from leaking to a side of the turn signal lamp assembly and being viewed by, e.g., a driver.

In the door mirror according to this invention, it is possible that the back-side transparent member includes a substrate receiving portion that holds a circuit substrate with the light source mounted thereon; and the light entrance portion is disposed at a position that allows the light entrance portion to face the light source when the circuit substrate is held in the substrate receiving portion. This configuration can ensure that light emitted from the light source enters the light entrance portion.

DESCRIPTION OF EMBODIMENT

Figure 2:
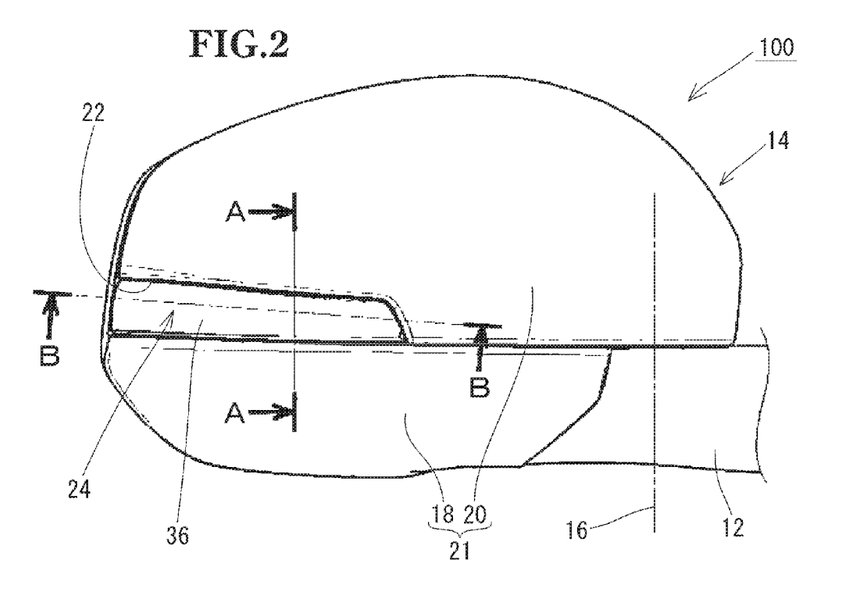
FIG. 2 is a back view of a door mirror with the turn signal lamp assembly in FIG. 1 incorporated therein.

An embodiment of this invention will be described. FIG. 2 is a back view of a door mirror with a turn signal lamp assembly according to this invention incorporated therein. A door mirror 100 is formed by a mirror rotating portion 14 being supported on a mirror base 12 fixedly attached to a right-side door (not illustrated) of a vehicle so as to be pivotable around a vertically-extending rotary axis 16 in such a manner that the door mirror 100 can be shifted between a folded position (a non-use position) and a restored position (use position). The mirror rotating portion 14 includes a mirror housing body (visor body) 18, a housing cover (visor cover) 20, a turn signal lamp assembly 24, a mirror surface angle adjustment mechanism (not illustrated) and a mirror plate (not illustrated). The mirror housing body 18 is supported on the mirror base 12 via a frame (not illustrated) (or directly with no frame therebetween) so as to be rotatable around the rotary axis 16. The housing cover 20 is placed and attached on an upper portion on the back surface side of the mirror housing body 18. The turn signal lamp assembly 24 is attached to the mirror housing body 18, and a light emission display surface is exposed to the outside from an opening 22 formed in a horizontally-long shape in a boundary between the mirror housing body 18 and the housing cover 20. The mirror surface angle adjustment mechanism is attached to a front surface of the frame or a front surface of the mirror housing body 18 within a front surface opening (not illustrated) of the mirror housing body 18. A mirror plate is attached to a front surface of the mirror surface angle adjustment mechanism via a mirror holder or directly mirror housing body 18 and the housing cover 20 form a mirror housing 21. Each of the mirror housing body 18 and the housing cover 20 is formed of a non-transparent resin.

Figure 3:
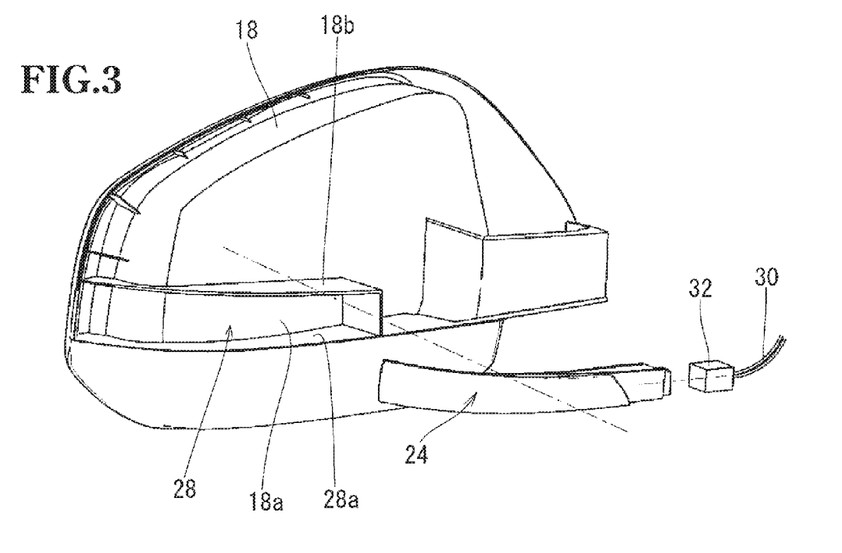
FIG. 3 is an exploded perspective view of mirror housing body of the door mirror and the turn signal lamp assembly in FIG. 2.

FIG. 3 illustrates the mirror housing body 18 and the turn signal lamp assembly 24 of the door mirror 100, that are separated from each other. Wall surfaces 18*b* are formed integrally with a back surface of the mirror housing body 18, whereby a recessed lamp housing portion 28 is formed. The lamp housing portion 28 has a front shape that allows the turn signal lamp assembly 24 to be housed therein with no substantial gap around a periphery of the turn signal lamp assembly 24. A surface 18*a* of the mirror housing body 18 (bottom surface of the lamp housing portion 28), the surface 18*a* facing a back surface of the turn signal lamp assembly 24, and peripheral wall surfaces 28*a* surrounding the periphery of the turn signal lamp assembly 24 are closed with no opening. Therefore, the lamp housing portion 28 is configured so as to have a light-blocking property except an opening in the front surface. Therefore, when the turn signal lamp assembly 24 is disposed so as to be housed in the lamp housing portion 28, light emitted from the turn signal lamp assembly 24 is prevented from leaking from the rear or sides of the turn signal lamp assembly 24, penetrating to the front surface side of the mirror housing body 18 (rear side of the vehicle) and being viewed by, e.g., a driver. Also, the inside of the housing body 18 (the inside of the front surface opening of the mirror housing body 18) is prevented from being seen through the turn signal lamp assembly 24 from the back surface side of the door mirror 100 (front side of the vehicle). The turn signal lamp assembly 24 is housed in the lamp housing portion 28 and fixedly attached to the mirror housing body 18 via non-illustrated screws. A wiring 30 is drawn from the inside of the vehicle body to the inside of the mirror housing body 18 via the mirror base 12 (FIG. 2). A connector 32 is attached to a distal end of the wiring 30. The connector 32 is connected to an end of the turn signal lamp assembly 24 on the side close to the vehicle body. With this configuration, power for lighting is supplied to a light source inside the turn signal lamp assembly 24 via the wiring 30. The turn signal lamp assembly 24 is attached to the mirror housing body 18, the connector 32 is connected to the turn signal lamp assembly 24, and then the housing cover 20 is put on and attached to the upper portion of the mirror housing body 18.

Figure 4:
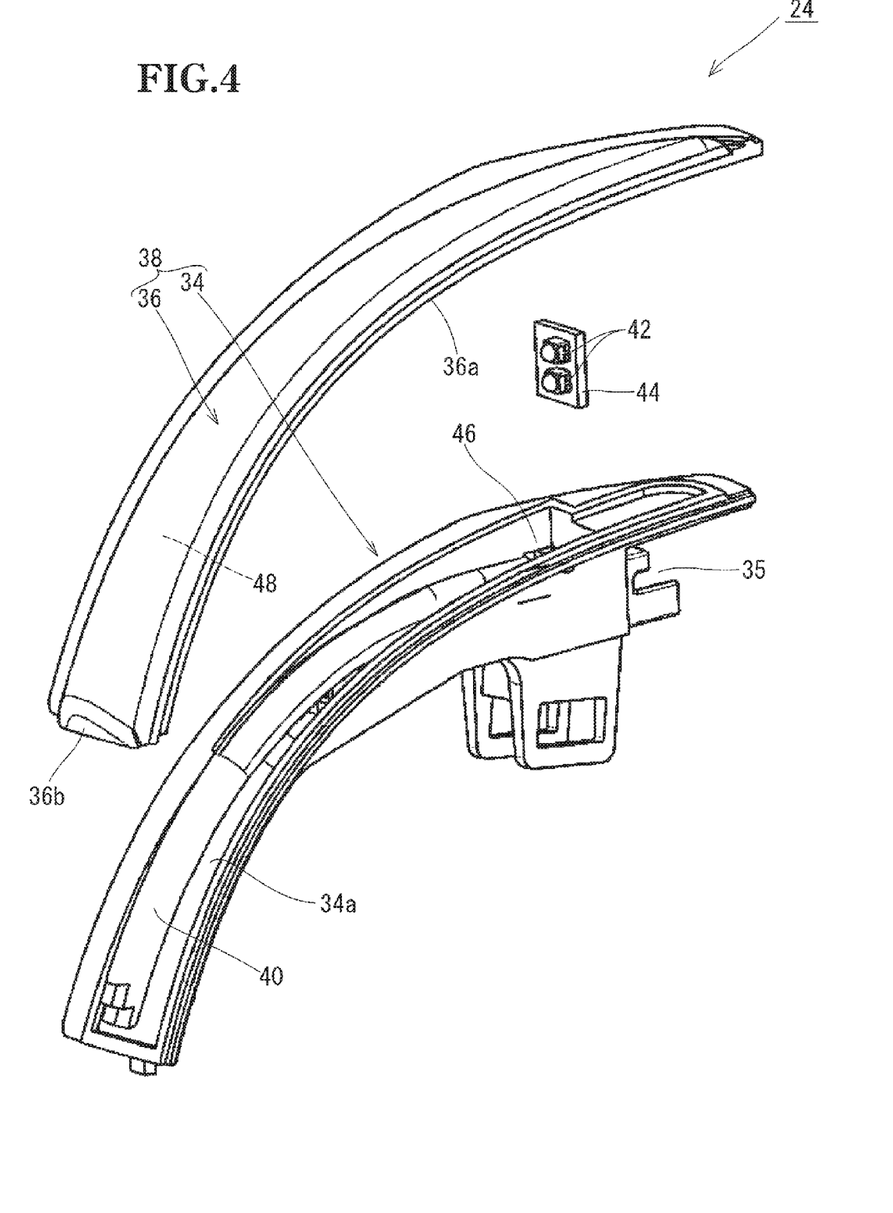
FIG. 4 is an exploded perspective view of the turn signal lamp assembly in FIG. 1.

FIG. 4 is an exploded view of the turn signal lamp assembly 24. The turn signal lamp assembly 24 includes lamp housing (back-side transparent member) 34 and an outer lens (front-side transparent member) 36. The lamp housing 34 and the outer lens 36 are overlaid on each other and respective peripheral edges 34*a* and 36*a* butting each other are joined to each other by means of welding or bonding, forming a casing (enclosure) 38 including a space (hollow) 37 (FIG. 1) inside. The casing 38 is formed so as to have an elongated front shape and a curved plan shape (shape as the casing 38 is viewed from above at its position when mounted in the vehicle) conforming an outer shape of the mirror housing 21 (FIG. 2). When the turn signal lamp assembly 24 is mounted in the door mirror 100, the casing 38 is disposed in such a manner that a long direction of the casing 38 is a horizontal direction and a short direction of the casing 38 is a vertical direction. Also, when the turn signal lamp assembly 24 is mounted in the door mirror 100, the outer lens 36 is exposed to the outer side of the door mirror 100 from the opening 22 (see FIG. 2) and the lamp housing 34 is disposed behind the outer lens 36. The lamp housing 34 is formed by a single piece formed by integral molding using a transparent resin member (for example, a colorless transparent resin member). The lamp housing 34 has a structure in which the entire peripheral edge 34*a* has a plate shape and a ridge 40 extending in a long direction of a front surface is formed at a center in a short direction of the front surface. The outer lens 36 and the lamp housing 34 are joined to each other by butting the peripheral edge 36*a* of the outer lens 36 against a front surface of the plate-shaped peripheral edge 34*a* of the lamp housing 34. At an end of an inner peripheral side of the lamp housing 34 on the side close to the vehicle body, a void (substrate receiving portion) 46 for housing and holding a circuit substrate 44 with LEDs (light source) 42 mounted thereon is formed. The outer lens 36 is formed by a single piece formed by integral molding using a transparent resin member (for example, a colorless transparent resin member). On a back surface of the outer lens 36, a recess 48 that contactlessly receives the ridge 40 of the lamp housing 34 via the hollow (FIG. 1) is formed.

Figure 1:
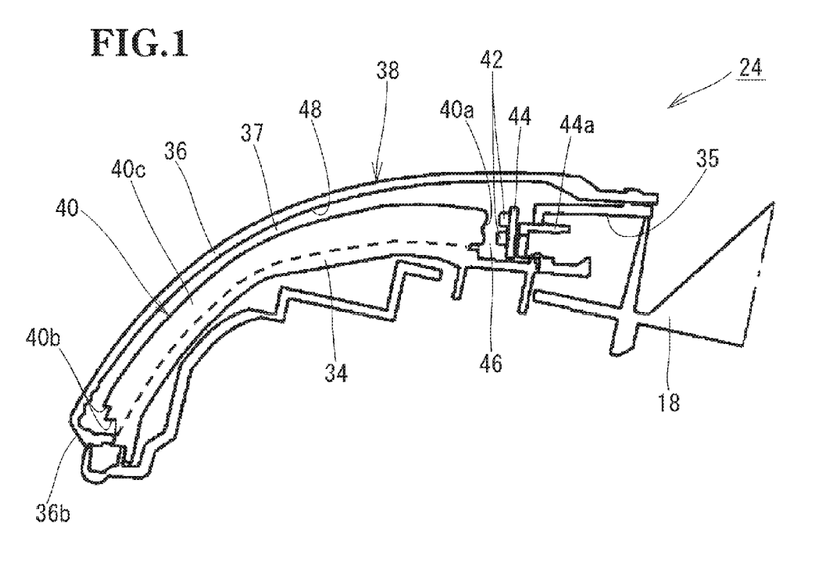
FIG. 1 is a diagram illustrating an embodiment of a turn signal lamp assembly according to this invention, the diagram being a cross-sectional view along arrow B-B in FIG. 2.

FIG. 1 is a cross-sectional view in a long direction of the turn signal lamp assembly 24 (cross-sectional view along arrow B-B in FIG. 2). The turn signal lamp assembly 24 is fixedly attached to the back surface of the mirror housing body 18. An end in a long direction of the ridge 40 of the lamp housing 34 on the side close to the vehicle body forms a light entrance portion 40*a* and an end of the ridge 40 on the side away from the vehicle body forms a light exit portion 40*b*, and part between the light entrance portion 40*a* and the light exit portion 40*b* forms a light-guiding lens portion (light-guiding portion) 40*c*. At an end of the lamp housing 34 on the side close to the vehicle body, a connector connection port 35 is formed. A connector 32 (FIG. 3) is water-tightly inserted and thereby connected to the connector connection port 35, whereby the hollow 37 of the casing 38 is water-tightly sealed from the outside. The circuit substrate 44 is housed and held in the substrate receiving portion 46 of the lamp housing 34. A terminal 44*a* of the circuit substrate 44 projects toward the outer side of the turn signal lamp assembly 24 from the connector connection port 35. Upon the connector 32 being inserted and connected to the connector connection port 35, the terminal 44*a* and the wiring 30 are connected, enabling power supply to the LEDs 42 via the circuit substrate 44. Upon the circuit substrate 44 being housed and held in the substrate receiving portion 46, light emission surfaces of the LEDs 42 are disposed at a position that allows the light emission surfaces to face the light entrance portion 40*a*. Consequently, a flux of turn signal light emitted from the LEDs 42 enters the inside of the ridge 40 from the light entrance portion 40*a*, is guided through the light-guiding lens portion 40*c* and is output from the light exit portion 40*b* to the outside of the ridge 40. The flux of turn signal light output from the light exit portion 40*b* passes through an end 36*b* of the outer lens 36 on the side away from the vehicle body and is discharged obliquely backward on the right side of the vehicle. Consequently, the turn signal light can be viewed from, e.g., another vehicle running on the obliquely back right of the vehicle. Also, a part of the flux of turn signal light entered from the light entrance portion 40*a* is output from respective positions in a front surface of the lamp housing 34, and passes through the outer lens 36 and is discharged toward the front side of the vehicle. Consequently, the turn signal light can be viewed also from the front side of the vehicle.

Figure 5:
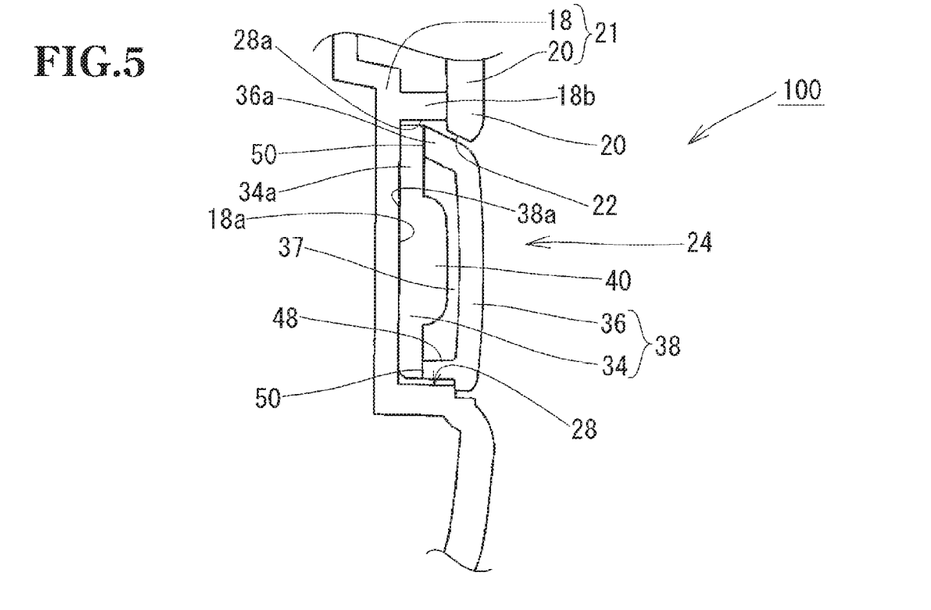
FIG. 5 is a cross-sectional view along arrow A-A in FIG. 2.

FIG. 5 is a cross-sectional view in a short direction of the turn signal lamp assembly 24 (cross-sectional view along arrow A-A in FIG. 2). The lamp housing 34 and the outer lens 36 are joined directly to each other by means of welding or bonding of the mutually butting peripheral edges 34a and 36a (joint 50), forming the casing 38. The ridge 40 is formed at a position in the front surface of the lamp housing 34, the position allowing the ridge 40 to be surrounded by the joint 50. The ridge 40 is contactlessly housed in the recess 48 in the back surface of the outer lens 36 via the hollow 37. when the turn signal lamp assembly 24 is housed in the lamp housing portion 28 at the back surface of the mirror housing body 18, the turn signal lamp assembly 24 is fixedly attached to the mirror housing body 18 by screw fastening. Upon the housing cover 20 being put on and attached to the mirror housing body 18, only a top surface of the outer lens 36 is exposed to the outside from the opening 22 formed at the boundary between the mirror housing body 18 and the housing cover 20, and, e.g., the joint 50 and the lamp housing 34 are hidden from the outside by the mirror housing body 18 and the housing cover 20. A light-blocking surface that blocks light passing through the lamp housing 34 in a front-back direction is formed by the surface 18a (bottom surface of the lamp housing portion 28) of the mirror housing body 18 formed using a non-transparent resin material, the surface 18a facing the back surface of the turn signal lamp assembly 24.

Figure 6:
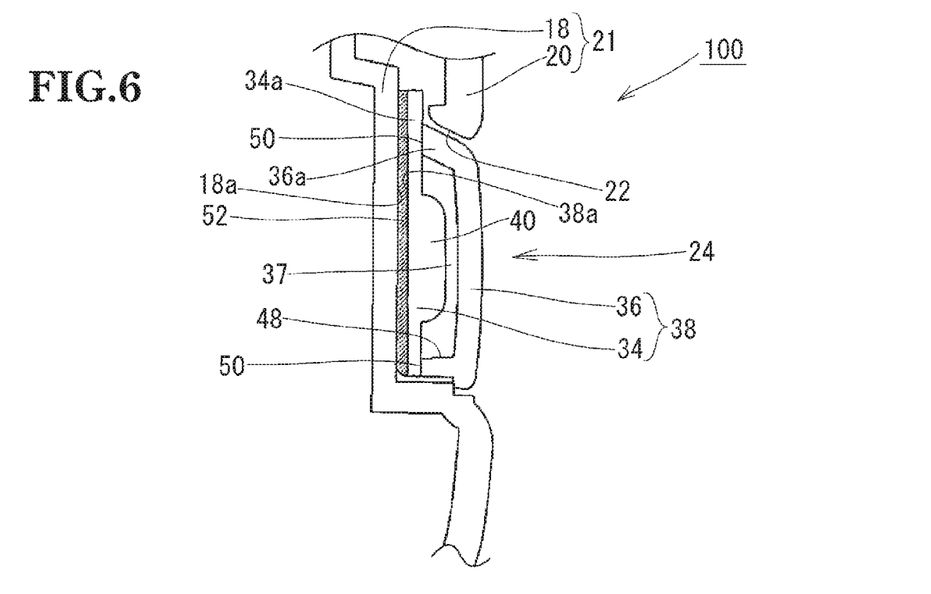
FIG. 6 is a cross-sectional diagram illustrating an alteration of the cross-sectional structure along arrow A-A in FIG. 2.

FIG. 6 is an alternation of the cross-sectional structure along arrow A-A in FIG. 2. In this alteration, a decorative surface 52 is disposed between the facing surfaces of the turn signal lamp assembly 24 and the mirror housing body 18. In the configuration, in FIG. 5, when the turn signal lamp assembly 24 is viewed through the front surface from the front surface side, a surface of the mirror housing body 18 (material surface of the non-transparent resin) is seen through the lamp housing 34 and the outer lens 36, the disposition of the decorative surface 52 enables provision of a visual effect exhibiting, e.g., a color, reflection and/or a pattern that are different from those of the surface of the mirror housing body 18. Consequently, the efficiency of emission of turn signal light can be enhanced and an effect can be provided in terms of design.

The decorative surface 52 can be, for example, fixedly disposed on the back surface 38a of the casing 38, fixedly disposed on the surface 18a of the mirror housing body 18, the surface 18a facing the back surface 38a of the casing 38, or disposed so as to be held between the back surface 38a of the casing 38 and the facing surface 18a of the mirror housing body 18 (fixed to neither of the surfaces 18a and 38a).

Also, the decorative surface 52 can be formed by, for example, attaching a plate-like or film-like decorative member to the back surface 38a of the casing 38 or the facing surface 18a of the mirror housing body 18, coating the back surface 38a of the casing 38 or the facing surface 18a of the mirror housing body 18 with a coating material having a color that is different from the color of the material (material color) of the facing surface 18a, forming (depositing) a metal film on the back surface 38a of the casing 38 or the facing surface 18a of the mirror housing body 18 by a film-forming technique, texturing or embossing the back surface 38a of the casing 38 or the facing surface 18a of the mirror housing body 18, or holding a plate-like or film-like decorative member between the back surface 38a of the casing 38 and the facing surface 18a of the mirror housing body 18 (the decorative member is fixed to neither of the surfaces 18a and 38a. In other words, the plate-like or film-like decorative member is sandwiched by means of a force for fixedly attaching the turn signal lamp assembly 24 to the mirror housing body 18 via the screws).

Also, the plate-like or film-like decorative member forming the decorative surface 52 can be formed by, for example, a non-transparent resin. plate or a non-transparent resin film having a ground color that is different from the material color of the facing surface 18a, a resin plate or a resin film coated with a coating material having a color that is different from the material color of the facing surface 18a, a resin plate or a resin film with a metal film formed thereon by a film-forming technique, a metal plate or a metal foil a resin plate or a resin film subjected to texturing or embossing. In the configuration in FIG. 6, if the decorative surface 52 is non-transparent, the decorative surface 52 doubles as the light-blocking surface, and if the decorative surface 52 is transparent (if the decorative surface 52 is, e.g., a textured surface or an embossed surface), the facing surface 18a forms the light-blocking surface.

Also, in the configuration in FIG. 6, no recessed lamp housing portion that houses the turn signal lamp assembly 24 is formed on the back surface of the mirror housing body 18; however, as in FIGS. 3 and 5, a recessed lamp housing portion 28 can be formed. If a recessed lamp housing portion 28 is formed, light emitted from the turn signal lamp assembly 24 can be prevented from leaking from the rear or sides of the turn signal lamp assembly 24, passing toward the front surface side (rear side of the vehicle) of the mirror housing body 18 and being viewed by, e.g., a driver. Furthermore, the inside of the door mirror 100 can more reliably be prevented from being seen through the turn signal lamp assembly 24 from the back surface side of the door mirror 100 (front side of the vehicle).

Also, although in the configuration in FIG. 6, the surface 18a of the mirror housing body 18, the surface 18a facing the back surface 38a of the casing 38, is formed by a closed surface, if the decorative surface 52 is non-transparent, the decorative surface 52 forms the light-blocking surface and thus the surface 18a can be formed by a surface including an opening.

Also, not only both of the front-side transparent member and the back-side transparent member of this invention can be colorless and transparent, but also either or both of the front-side transparent member and the back-side transparent member can be, e.g., colored and transparent or semitransparent (turbid transparent).

The invention claimed is:

1. A vehicle door mirror, comprising
a turn signal lamp assembly including a casing comprising a front-side transparent member having a recess and a back-side transparent member having a covering surface that covers the recess of the front-side transparent member,
the front-side transparent member and the back-side transparent member being overlaid on each other and joined to each other at peripheral edges to define an outer housing of the turn signal lamp assembly;
a light body comprising a light entrance portion that receives incident light emitted from a light source, a light-guiding portion that guides the incident light, and a light exit portion that outputs the guided light, the light body being formed integral with the covering surface of the back-side transparent member, wherein a front surface of the light guiding portion is covered by the front-side transparent member such that a space is defined between the front surface of the light guiding portion and a recessed surface that defines the recess of the front-side transparent member; and the vehicle door mirror includes a light-blocking surface that blocks light passing through the back-side transparent member in a front-back direction, at a back surface of the casing of the turn signal lamp assembly.

2. The vehicle door mirror according to claim 1, wherein:
the casing of the turn signal lamp assembly has an elongated shape;
the light body includes a ridge at a center in a short direction of a front surface thereof, the ridge extending in a long direction; and
the ridge includes the light entrance portion, the light-guiding portion and the light exit portion.

3. The vehicle door mirror according to claim 1, further comprising:
a mirror housing that holds a mirror of the vehicle door mirror; and
wherein the light-blocking surface is fixedly disposed at one of:
(i) a back surface of the casing of the turn signal lamp assembly;
(ii) a surface of a mirror housing of the vehicle door mirror, the mirror housing having the turn signal lamp assembly disposed therein, wherein the surface of the mirror housing faces the back surface of the casing; and
(iii) the back surface of the casing so as to be held between the back surface of the casing and the surface of the mirror housing, wherein the surface of the mirror housing faces the back surface of the casing.

4. The vehicle door mirror according to claim 2, further comprising:
a mirror housing that holds a mirror of the vehicle door mirror; and
wherein the light-blocking surface is fixedly disposed at one of:
(i) a back surface of the casing of the turn signal lamp assembly;
(ii) a surface of a mirror housing of the vehicle door mirror, the mirror housing having the turn signal lamp assembly disposed therein, wherein the surface of the mirror housing faces the back surface of the casing; and
(iii) the back surface of the casing so as to be held between the back surface of the casing and the surface of the mirror housing, wherein the surface of the mirror housing faces the back surface of the casing.

5. The vehicle door mirror according to claim 3, wherein, when the light-blocking surface is fixedly disposed at the surface of the mirror housing, the surface facing the back surface of the casing includes a material surface comprising a non-transparent material, wherein the non-transparent material is a material of the mirror housing.

6. The vehicle door mirror according to claim 1, further comprising:
a mirror housing that holds a mirror of the vehicle door mirror; and
wherein a decorative surface is positioned between the back surface of the casing and the light-blocking surface and provides a visual effect that is different from a visual effect provided by a material included in the mirror housing when the turn signal lamp assembly is viewed from the front surface of the light guiding portion.

7. The vehicle door mirror according to claim 2, further comprising:
a mirror housing that holds a mirror of the vehicle door mirror; and
wherein a decorative surface is positioned between the back surface of the casing and the light-blocking surface and provides a visual effect that is different from a visual effect provided by a material included in the mirror housing when the turn signal lamp assembly is viewed from the front surface of the light guiding portion.

8. The vehicle door mirror according to claim 3, further comprising:
a mirror housing that holds a mirror of the vehicle door mirror; and
wherein a decorative surface is positioned between the back surface of the casing and the light-blocking surface and provides a visual effect that is different from a visual effect provided by a material included in the mirror housing when the turn signal lamp assembly is viewed from the front surface of the light guiding portion.

9. The vehicle door mirror according to claim 5, further comprising:
a mirror housing that holds a mirror of the vehicle door mirror; and
wherein a decorative surface is positioned between the back surface of the casing and the light-blocking surface and provides a visual effect that is different from a visual effect provided by a material included in the mirror housing when the turn signal lamp assembly is viewed from the front surface of the light guiding portion.

10. The vehicle door mirror according to claim 6, wherein the decorative surface is fixedly disposed at one of:
(i) a back surface of the casing of the turn signal lamp assembly;
(ii) a surface of the mirror housing, the surface of the mirror housing facing the back surface of the casing; and
(iii) the back surface of the casing so as to be held between the back surface of the casing and the surface of the mirror housing, the surface of the mirror housing facing the back surface of the casing.

11. The vehicle door mirror according to claim 10, wherein the decorative surface is disposed on one of the back surface of the casing of the turn signal lamp assembly and the surface of the mirror housing via any one of:
attachment of a plate-shaped decorative member; attachment of a film that is a decorative member; a coating; formation of a metal film; texturing; and embossing.

12. The vehicle door mirror according to claim 6, wherein the decorative surface doubles as the light-blocking surface.

13. The vehicle door mirror according to claim 1, wherein:
a recessed lamp housing portion including a non-transparent peripheral wall surface is formed in a mirror housing that holds a mirror of the vehicle door mirror; and the turn signal lamp assembly is housed and disposed in the lamp housing portion.

14. The vehicle door mirror according to claim 1, wherein:
the back-side transparent member includes a substrate receiving portion that holds a circuit substrate with the light source mounted thereon; and
the light entrance portion is disposed at a position that allows the light entrance portion to face the light source when the circuit substrate is held in the substrate receiving portion.

15. A turn signal lamp assembly to be incorporated in a vehicle door mirror,
wherein the turn signal lamp assembly includes a casing comprising a front-side transparent member having a recess and a back-side transparent member having a covering surface that covers the recess of the front-side transparent member,
the front-side transparent member and the back-side transparent member being overlaid on each other and joined to each other at peripheral edges to define an outer housing of the turn signal lamp assembly; and
a light body comprising a light entrance portion that receives incident light emitted from a light source, a light-guiding portion that guides the incident light, and a light exit portion that outputs the guided light, the light body being formed integral with the covering surface of the back-side transparent member,
wherein a front surface of the light guiding portion is covered by the front-side transparent member such that a space is defined between the front surface of the light guiding portion and a recessed surface that defines the recess of the front-side transparent member.

16. The turn signal lamp assembly according to claim 15, wherein a light-blocking surface that blocks light passing through the back-side transparent member in a front-back direction is provided at a back surface of the casing.

17. The turn signal lamp assembly according to claim 15, wherein:
the casing of the turn signal lamp assembly has an elongated shape;
the light body includes a ridge at a center in a short direction of a front surface thereof, the ridge extending in a long direction; and
the ridge includes the light entrance portion, the light-guiding portion and the light exit portion.

18. The turn signal lamp assembly according to claim 16, wherein:
the casing of the turn signal lamp assembly has an elongated shape;
the light body includes a ridge at a center in a short direction of a front surface thereof, the ridge extending in a long direction; and
the ridge includes the light entrance portion, the light-guiding portion and the light exit portion.

19. The vehicle door mirror according to claim 1, wherein the light body and the covering surface of the back-side transparent member is defined by a unitarily molded transparent resin member.

20. The turn signal lamp assembly according to claim 15, wherein the light body and the covering surface of the back-side transparent member is defined by a unitarily molded transparent resin member.

* * * * *